(12) United States Patent
Jonsson

(10) Patent No.: US 12,386,894 B1
(45) Date of Patent: Aug. 12, 2025

(54) HETEROGENOUS DATA INGESTION AND INTEGRATION

(71) Applicant: Amazon Technologies, Inc., Seattle, WA (US)

(72) Inventor: Jan Henrik Jonsson, Newport Beach, CA (US)

(73) Assignee: Amazon Technologies, Inc., Seattle, WA (US)

(*) Notice: Subject to any disclaimer, the term of this patent is extended or adjusted under 35 U.S.C. 154(b) by 94 days.

(21) Appl. No.: 17/364,389

(22) Filed: Jun. 30, 2021

(51) Int. Cl.
*G06F 16/84* (2019.01)
*G06F 16/22* (2019.01)
*G06F 16/25* (2019.01)
*G06F 16/9035* (2019.01)

(52) U.S. Cl.
CPC .............. *G06F 16/86* (2019.01); *G06F 16/22* (2019.01); *G06F 16/258* (2019.01); *G06F 16/9035* (2019.01)

(58) Field of Classification Search
CPC ........ G06F 16/86; G06F 16/22; G06F 16/258; G06F 16/9035
See application file for complete search history.

(56) References Cited

U.S. PATENT DOCUMENTS

| 11,080,423 | B1* | 8/2021 | Kassam-Adams | ..... G16H 15/00 |
| 2005/0273717 | A1* | 12/2005 | Breeden | ................ G06F 16/954 |
| | | | | 707/E17.109 |
| 2007/0027917 | A1* | 2/2007 | Ariel | ..................... G06Q 10/109 |
| 2010/0205217 | A1* | 8/2010 | Kocsis | ................... G06F 16/972 |
| | | | | 707/759 |
| 2011/0111738 | A1* | 5/2011 | Jones | ................... H04M 3/4878 |
| | | | | 455/418 |
| 2013/0054703 | A1* | 2/2013 | Neill | ...................... G06F 9/5055 |
| | | | | 709/217 |
| 2015/0227579 | A1* | 8/2015 | Cantarero | ............. G06F 16/313 |
| | | | | 707/708 |
| 2015/0235258 | A1* | 8/2015 | Shah | ................... G06Q 30/0242 |
| | | | | 705/14.45 |
| 2018/0025439 | A1* | 1/2018 | Chandran | .............. G06Q 50/01 |
| | | | | 715/704 |

* cited by examiner

*Primary Examiner* — Cheyne D Ly
(74) *Attorney, Agent, or Firm* — Davis Wright Tremaine LLP

(57) ABSTRACT

In various embodiments described in the present disclosure data objects are ingested and associated with a profile. For example, an object mapping indicates a set of keys included in a data object which are used to search an index to determine a profile that is associated with the data object. In various embodiments, data from the data object is then used to update the profile.

20 Claims, 6 Drawing Sheets

HETEROGENOUS DATA INGESTION AND INTEGRATION

BACKGROUND

A data store service may utilize a collection of programs that enables storage, modification, and extraction of information from a data store. Many different types of data store services exist, ranging from small systems that execute on client devices to large systems that run on server computer systems. Data storage services can differ widely in the types of data that are stored and the ways in which that data is organized within a particular data store service. For example, user data can include order history, call log, contact information, and other structured and unstructured data which can be organized using relational, flat, and hierarchical techniques.

BRIEF DESCRIPTION OF THE DRAWINGS

Various techniques will be described with reference to the drawings, in which.

DETAILED DESCRIPTION

Figure 1:
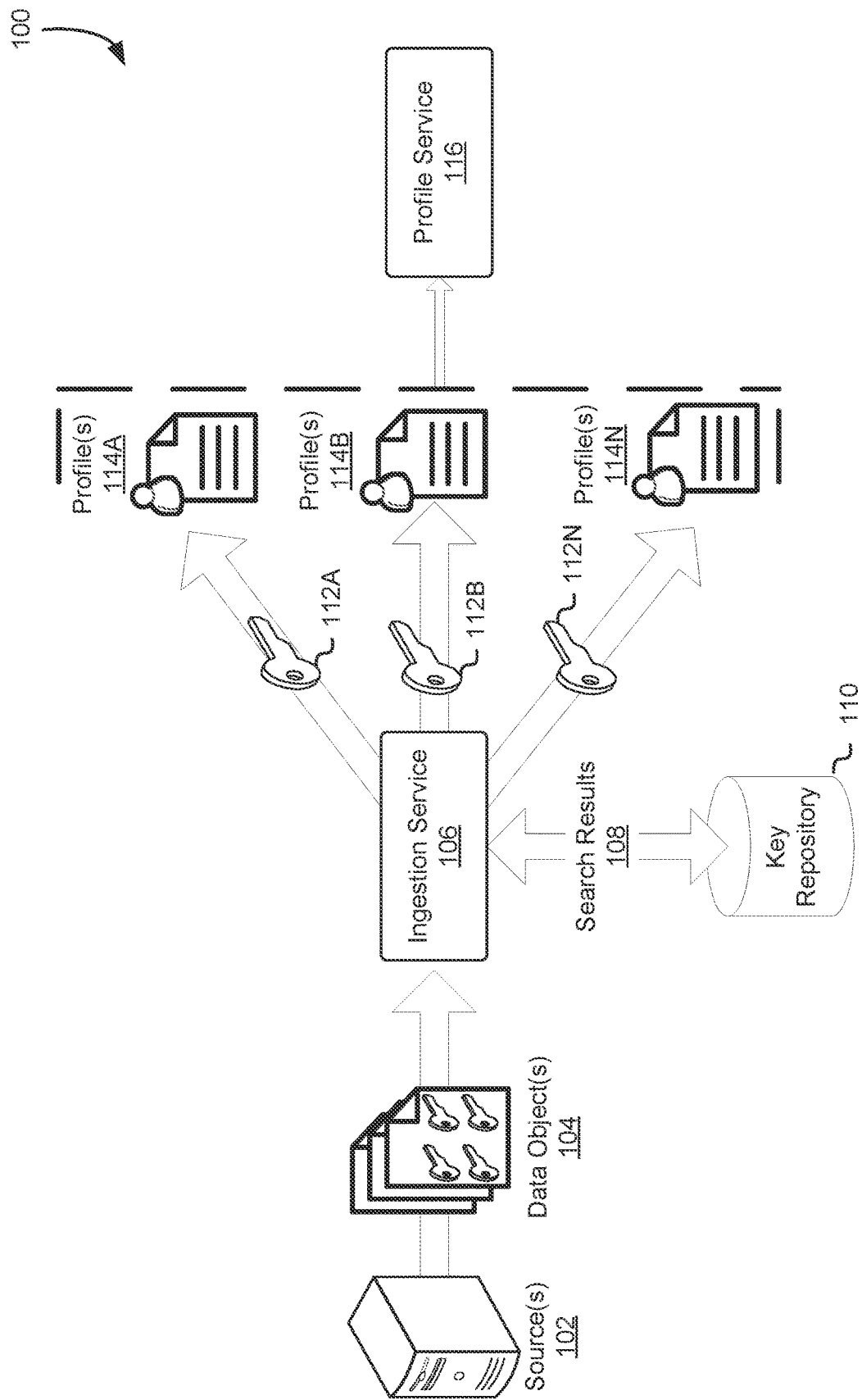
FIG. 1 illustrates an environment in which heterogeneous data is ingested and stored in association with profiles in accordance with an embodiment.

A technology is described for heterogeneous data object ingestion that allows for loosely related data to be coherently organized into profiles containing data related to various entities. In one example, a single profile contains all the information collected and ingested for a particular entity (e.g., a user) and enables access to the information from a single profile view. An ingestion service is responsible for ingesting (e.g., collecting, processing, storing, etc.) data objects from various sources and persisting and/or updating profiles to include information obtained from the data objects and/or the data objects themselves. A profile can include any number of fields representing data associated with a user or other entity, any number of data objects of one or more data object types. In addition, to maintain profiles, the data storage model, includes keys that are indexed and associated with the profiles such that when data objects are ingested the keys can be used to determine a particular profile to associate the data objects with.

For example, when ingesting a data object, an object mapping can be used to obtain a set of keys associated with the data object. In such examples, an index or other data store is searched using at least one key of the set of keys to determine a profile associated with the data object. In this manner the set of keys can be used to relate heterogeneous data objects (e.g., records, order history, communications, account information, etc.) to a particular profile. In addition, this enables access to these different data objects from a single location. For example, a profile can represent a particular entity and can provide access to various ingested data objects including, for example, associated with deliveries, support contacts, emails, and other information associated with the particular entity.

As described in greater detail below, the keys can include any value that is indexed. In one example, the keys can include string values, phone numbers, email addresses, street addresses, account numbers, or other values that are capable of being indexed. Furthermore, the keys can include both unique and non-unique keys (e.g., unique relative to other keys used by the profile service). In addition, the keys can be associated with a particular type. In one example, a key is assigned as a search only key (e.g., phone number), which may prevent the profile service from persisting the key. Other types of keys can include profile identifying keys (e.g., an account number), which can be used to uniquely identify a data object within a profile. Furthermore, in some examples, unique keys (e.g., profile identifying keys) are used to replace data objects associated with a particular profile with new data objects including updated information.

As described in greater detail below, the keys obtained from the data objects include various values such as string values which, in some examples, are normalized. For example, normalizing phone numbers, names, addresses, account numbers, and other values associated with the keys. Once the keys have been obtained from a particular data object and the data object has been ingested by the ingestion service, the keys are then searchable by the ingestion service, profile service, or other systems and services of a computing resource service provider. This enables systems and services of the computing resource service provider to determine which profile that a particular piece of information is related to (e.g., a particular data object). The data objects can include any structured and/or semi-structured data object. Furthermore, the data objects can include an object type and/or a domain name (e.g., a logical container that allows for multiple groups of profiles).

When ingesting data objects, the ingestion service or other system, utilizes the object mapping to determine the location of a key within the data object, extract the key, and searches the key in a key repository or other index. If the key is stored in the key repository, this indicates that a previously ingested data object including the key has been persisted and associated with a particular profile. As a result, the ingestion service or other system, may determine that the data object should be associated with a particular profile as well. However, if none of the keys obtained from the data object match keys stored in the key repository, a new profile may be created and associated with the data object. In some situations, the ingestion service or other system, may prevent the creation of new profiles using particular types of keys and an error is returned. Returning to the previous examples, if the key is found in the repository or a new profile is created, the profile service or other system, causes the data object to be persisted and updates the profile based at least in part on information included in the data object (e.g., fields such as name, address, order number, etc.). In addition, the profile service or other system, can also update and/or generate keys maintained by the key repository.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) allowing ingestion of heterogeneous data objects; (2) simplifying the user experience when ingesting heterogeneous data objects from a plurality of different sources; (3) allowing loosely related data objects to be correlated through a single profile; and (4) creating a single location of the aggregation of all data related to a particular entity.

FIG. 1 is a block diagram illustrating an environment 100 in which an ingestion service 106 obtains a set of keys 112A-112N from data objects 104 in order to associate the data objects 104 with a set of profiles 114A-114N in accordance with at least one embodiment. In various embodiments, the data objects 104 are obtained from one or more source(s) 102 by the ingestion service 106. The data objects 104, as described in greater detail below, include structured or semi-structured data objects in accordance with at least one embodiment. In one example, a semi-structured data object includes one or more fields organized within the data object in accordance with a format and/or syntax associated with the semi-structured data objects. In various examples, the data objects include documents, contact lists, call logs, chat logs, data logs, HyperText Markup Language (HTML) data, Extensible Markup Language (XML) data, JavaScript data, Cascading Style Sheets (CSS) data, JavaScript Object Notation (JSON) data, and/or another appropriate structured language or semi-structured data.

In various embodiments, the ingestion service 106 includes a computer system, program, process, client, server, service, application, module, operating system entity, controlling domain, communication node or collection of these and/or other such computer system entities that implement various components of the ingestion service 106 as described in the present disclosure. In one example, the ingestion service 106 includes an interface that receives Application Programming Interface (API) calls that, as a result of being processed, cause servers executing the ingestion service 106 to perform various operations described in the present disclosure such as ingesting data objects 104.

In various embodiments, the source(s) 102 include any computer system capable of recording, storing, and/or transmitting data objects 104. For example, the source(s) 102 include, in various embodiments, a service (e.g., Salesforce™, Marketto™, or Zendesk™), a database, storage system, client computer system, service, or other computing device. In one example, the source 102 includes a cloud contact center which records communications between users and the cloud contact center as data objects 104. In such examples, the data objects 104 can include user phone numbers, account numbers, an identifier of the communication, subject information, call logs, chat logs, or other information associated with the communication stored as a JSON data object. Examples of JSON data objects are described in greater detail below. In various embodiment, this enables data from any of the source(s) 102 to be ingested and incorporated into the profiles regardless of how the profile has the data organized or how the incoming data objects have the data organized.

In various embodiments, the sources 102 transmit the data objects 104 to the ingestion service 106 periodically or aperiodically. For example, the sources 102 may transmit the data objects 104 contemporaneously or near contemporaneously with generation of the data objects 104. Returning to the example above, once a communication between a user and the cloud contact center is complete, a corresponding data object is generated and/or completed and transmitted to the ingestion service 106. In yet other embodiments, an intermediary such as a storage service obtains the data objects 104 and the ingestion service 106 obtains a notification that the data objects 104 have been received by the storage service. In such embodiments, the ingestion service 106 may place the data objects 104 in a queue and process data objects 104 for ingestion from the queue.

In various embodiments, an API call causes the ingestion service 106 to obtain the data objects 104 from a data store of a data storage service accessible to the ingestion service 106. In yet other embodiments, the sources 102 provide the data objects 104 directly to the ingestion service 106 (e.g., via an API call). In addition, a topic or feed can be used to trigger the API when the data objects are available for ingestion in accordance with at least one embodiment. Once the data objects 104 are obtained by the ingestion service 106, in various embodiments, the ingestion service 106 unpacks the data objects 104 to obtain a set of keys 112A-112N. As described in greater detail below, the set of keys 112A-112N, in one example, includes different types of keys that define how the ingestion service 106 utilizes the keys. For example, the set of keys 112A-112N includes profile keys that the ingestion service 106 uses to search a key repository 110.

In various embodiments, at least one key of the set of keys 112A-112N identifies a particular profile of the set of profiles 114A-114N maintained by a profile service 116. As described in greater detail below, a profile of the set of profiles 114A-114N is associated with a particular entity, and enables access to all ingested information associated with the particular entity. In an embodiment, once the ingestion service 106 obtains the set of keys 112A-112N from the data objects 104, a subset of keys of the set of keys 112A-112N are used to obtain search results 108 from the key repository 110. As described in greater detail below, the key repository 110, in at least one embodiment, includes an index of at least a subset of the keys ingested by the ingestion service 106 and is included in at least one profile of the set of profiles 114A-114N. In one example, the keys are not cryptographic keys, but rather represent information such as, for example, names, email addresses, phone numbers, etc. of entities stored as profiles, as such the key repository 110 indexes particular values (e.g., a phone number) with the profile within which the particular value is stored and/or associated with.

In various embodiments, the search results 108 indicate a subset of keys of the set of keys 112A-112N that match (e.g., are equivalent to or otherwise associated with) keys maintained in the key repository 110 and that are associated with one or more profiles of the set of profiles 114A-114N. In one example, the set of keys 112A-112N includes a first key corresponding to a name (e.g., "John Doe") and a second key corresponding to a phone number (e.g., (555) 123-4567), the search results 108 indicate a match to one or more profiles if the index includes either the first key, the second key, or any equivalents (e.g., the first key with the value "John Doe" is the same as an indexed value "John Doe" maintained in the key repository 110). In various embodiments, equivalents include keys that represent the same data, but that may be in a different format. For example, a phone number may be considered equivalent if the data is the same, but the format is different (e.g., "555-123-4567" and "(555) 123-4567"). In yet other embodiments described below, the values corresponding to keys are normalized when determined whether a particular key extracted from a data object matches a particular key indexed in the key repository 110.

In an embodiment, if the search results 108 obtained by the ingestion service 106 indicate more than one result (e.g., profiles), the result is discarded as invalid. In other words, in such embodiments, if a particular key is associated with more than one profile, the ingestion service determines the search results are invalid and does not use the particular key to associate the data object from which the particular key was obtained with a profile of the set of profiles 114A-114N. Furthermore, if the search for a particular key returns an invalid result (e.g., no matching profiles, more than one matching profile, etc.), the ingestion service 106 selects another key to perform the search. In various embodiments, searching for the subset of keys within the key repository 110 is performed in serial (e.g., a first key is selected and searched, if the results are invalid, then a second key is selected and searched). In yet other embodiments, the subset of keys is searched in parallel in order to obtain results faster and/or determine a plurality of matches. The ingestion service 106, in various embodiments, performs the search and obtains the search results until a profile is uniquely (e.g., relative to the set of profiles 114A-114N) identified. In addition, in some embodiments, a plurality of keys obtained from a particular data object 104 are capable of uniquely identifying a particular profile (e.g., profile 114A). In such embodiments, the ingestion service 106 can terminate the search once the first key is determined to uniquely identify the particular profile. In one example, a first key representing a name and a second key representing an email address both uniquely identify the profile 114A, when ingesting the data object 104 with these keys, the ingestion service 106 terminates the search once either the first key or the second key has been searched and identifies the profile 114A as being associated with the data object 104.

In addition, in various embodiments, the ingestion service 106 maintains a hierarchy for searching particular keys of the set of keys 112A-112N. In one example, certain keys are marked as secondary. In such an example, keys marked as secondary may be searched only if all other keys obtained for a particular data object have failed to return a valid result (e.g., a particular profile). In various embodiments, the search results 108 indicate that a particular profile includes that same value as a search for the same field. In one example, the keys include a key name and/or category (e.g., username) and a value (e.g., "John Doe"). In such examples, the search results 108 indicate a positive result (e.g., a match) if the value and the category match. In addition, values associated with the keys, in an embodiment, can be normalized prior to searching and storing. For example, a string value representing the key can be normalized (e.g., removing white spaces, changing case, removing special characters, etc.) and a search for the normalized string value can be performed on the category matching the key as indicated in the key repository 110 (e.g., name, email, address, phone number, etc.).

In various embodiments, the key repository 110 includes any database or other storage system that supports indexing. For example, the key repository can include any database such as a Structured Query Language (SQL) database or a non-SQL database. The key repository 110, in at least one embodiment, provides a repository for keys that can be searched from specific values and/or string values. In addition, the set of profiles 114A-114N includes semi-structured information about a particular entity in accordance with at least one embodiment. Furthermore, in some examples, a standard profile scheme is used containing one or more fields, such as phone numbers, email addresses, names, and other data. In various embodiments, data obtained from the data objects 104 is retrieved and converted to the standard format regardless of the source 102 (e.g., Salesforce®, ServiceNow®, and/or Marketo®).

In various embodiments, a profile object is a single unit of information known about a profile (e.g., data object associated of a profile). Furthermore, in various embodiments, a particular profile includes a set of profile objects that includes data associated with an entity. Such data, in an example, can include information about a phone call, a ticket, a case, a click-stream record from a website, name, address, phone number, other contact information, order history, promotional material, support information, sales information, marketing information, biographical data, historical data, or any other data that can be associated with an entity. As described in the present disclosure, profile objects, in one example, can be obtained from a semi-structured JSON document. Furthermore, in various embodiments, the profile objects can be associated with type information and/or field information. In such embodiments, the type and/or field refers to a particular location and/or structure as indicated in an object mapping described in greater detail below in connection with FIG. 3. In one example, the object mapping defines how that specific type of data object (e.g., contact cards, call logs, etc.) should be ingested into a particular profile. In addition, in various embodiments, the object mapping indicates to the ingestion service 106 how to ingest a specific type of data object. For example, the object mapping indicates how data should be populated from the data objects (e.g., of the particular type indicated) and ingested into the profiles, what fields should be indexed in the data object, and how those fields should then be used to assign the data object a specific profile.

In various embodiments, the data object mapping indicates a conversion schema that maps particular data objects 104, types of data objects 104, data within the data objects 104, and/or fields within the data objects 104 to the set of profiles 114A-114N maintained by the system (e.g., profile service 116). Data objects 104, in various embodiments, include various semi-structured data objects such as JSON blobs, XML documents, of other structured data or unstructured data. An example is illustrated by the following pseudo-code of a data object:

```
"account": 1234,
    "email": "john@examplecorp.com",
    "address": {
    "address1": "Street",
    "zip": "Zip",
    "city": "City"
    },
    "firstName": "John",
    "lastName": "Doe"
}
```

In an embodiment, data object mapping defines a schema for mapping or otherwise converting values within the data object 104 to values within profiles 114A-114N. In addition, the data object mapping, in various embodiments, defines indexing for keys (e.g., the set of keys 112A-112N) associated with the profiles 114A-114N. In one example, the following pseudo-code shows that incoming data object mapping into a particular profile and indexing PersonalEmailAddress, fullName, and accountId (which is a unique key relative to the set of keys):

```
{
    "Fields": {
    "accountId": {
```

```
    "Source": "source.account",
    "Target": "_profile.AccountNumber",
    "ContentType": "NUMBER"
},
"shippingAddress.address1": {
    "Source": "_source.address.address1",
    "Target": "_profile.ShippingAddress.Address1"
},
"shippingAddress.postalCode": {
    "Source": "_source.address.zip",
    "Target": "_profile.ShippingAddress.PostalCode"
},
"shippingAddress.city": {
    "Source": "_source.address.city",
    "Target": "_profile.ShippingAddress.City"
},
"personalEmailAddress": {
    "Source": "_source.email",
    "Target": "_profile.PersonalEmailAddress",
    "ContentType": "EMAIL_ADDRESS"
},
"fullName": {
    "Source": "{{_source.firstName}} {{_source.lastName}}"
},
"firstName":
    {"Source": "_source.firstName",
    "Target": "_profile.FirstName"
},
"lastName": {
    "Source": "_source.lastName",
    "Target": "_profile. LastName"
}
},
"Keys": {
"_email": [
    {
        "FieldNames": ["personalEmailAddress"]
    }
],
"_fullName": [
    {
        "FieldNames": ["fullName"]
    }
],
"_account": [
    {
        "StandardIdentifiers": ["PROFILE", "UNIQUE"],
        "FieldNames": ["accountId"]
    }
]
}
}
```

In this example, "email" and "fullname" are indexed, but are not used to search for the profiles 114A-114N. Furthermore, in this example, the "account" key is indicated as a unique key. In various embodiments, any time a particular data object with the same "account" value is ingested, the ingestion service 106 or other service, overwrites the previous value with the same "account" value.

Figure 2:
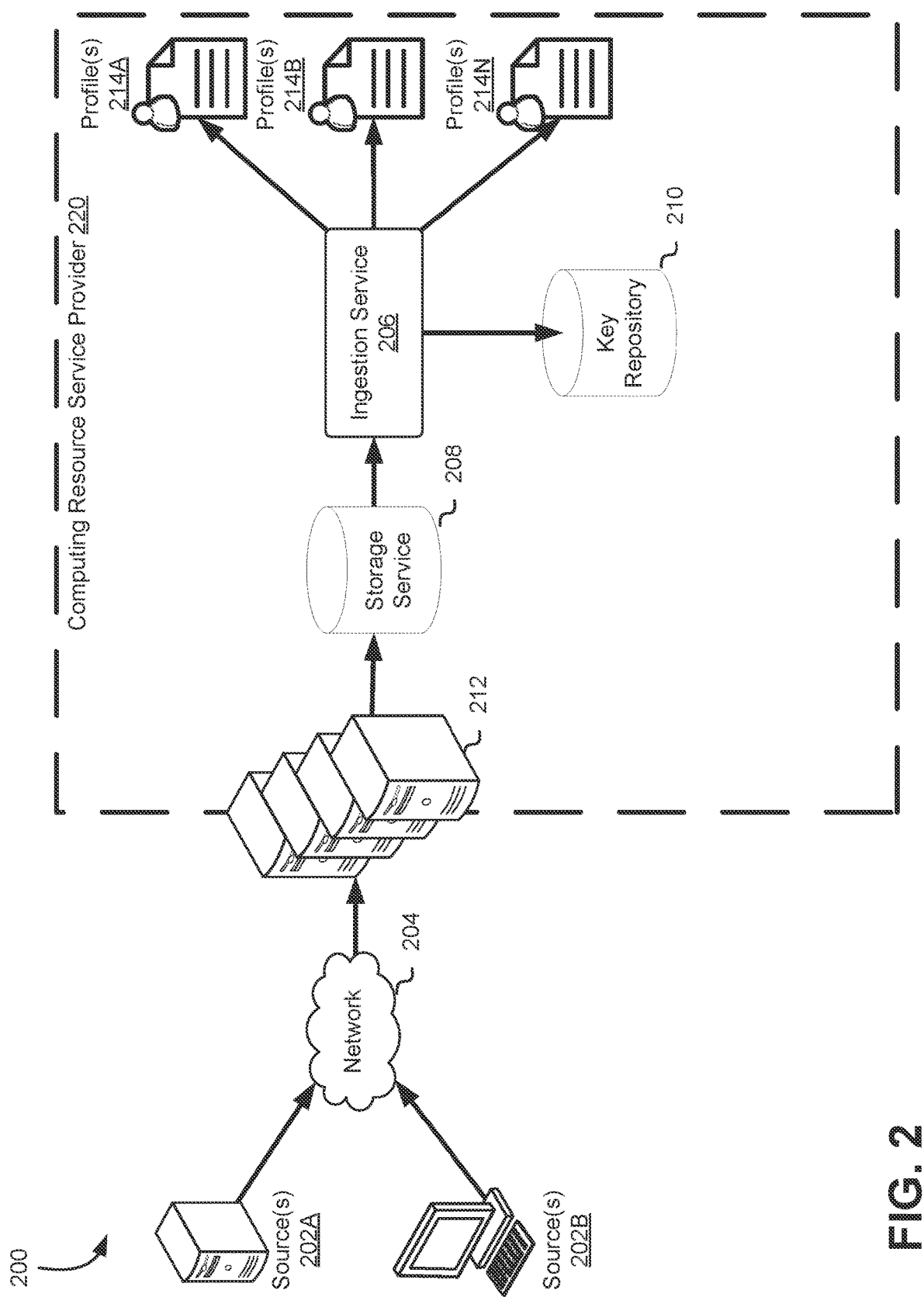
FIG. 2 illustrates an environment in which an ingestion service stores data objects in association with a set of profiles of a profile service in accordance with an embodiment.

FIG. 2 is a block diagram illustrating an environment 200 in which an ingestion service 206 ingests data objects from various sources 202A & 202B to populate a set of profiles 214A-214N in accordance with at least one embodiment. In various embodiments, a computing resource service provider 220 provides entities with computing resources to perform various operations as described in the present disclosure. For example, the computing resource service provider 220 provides computational and storage resources to allow an entity to maintain the set of profiles 214A-214N and ingest data objects (not shown in FIG. 2 for simplicity) which can be used to update the set of profiles 214A-214N. Furthermore, the set of profiles 214A-214N, in at least one embodiment, includes a logical container for information associated with a single entity or user as described above in connection with the set of profiles 114A-114N illustrated in FIG. 1.

The computing resource service provider 220 may provide a variety of services to the entity and the entity may communicate with the computing resource service provider 220 via an interface, which may be a web service interface or any other type of user interface. As illustrated in FIG. 2, server computer systems 212, in accordance with an embodiment, provide the interface for the services of the computing resource service provider 220 as well as execute the services themselves. In one example, each service has a separate interface. In other examples, subsets of the services have corresponding interfaces in addition to or as an alternative to the interface described above. In an embodiment, the entity is an organization that utilizes one or more of the services provided by the computing resource service provider 220 to maintain and deliver information to its employees, which may be located in various geographical locations. For example, a profile service as described above in connection with FIG. 1, provides support agents with information associated with the profiles 214A-214N to help users troubleshoot and correct various issues.

In another example, the entity utilizes the services of the computing resource service provider 220 to provide content from the sources 202A and/or 202B for ingestion by the ingestion service 206. As shown in FIG. 2, the sources 202A and/or 202B communicate with the computing resource service provider 220 through a network 204, whereby the network 204 may be a communication network, such as the Internet, an intranet or an Internet service provider (ISP) network in accordance with an embodiment. In one example, communications from the sources 202A and/or 202B to the computing resource service provider 220 cause the computing resource service provider 220 and/or services thereof, such as the ingestion service, to operate in accordance with one or more embodiments described in the present disclosure or a variation thereof. For example, data objects from the sources 202A and/or 202B are obtained by the server computer systems 212 of the computing resource service provider 220 and stored by a storage service 208 such that the data objects are accessible by the ingestion service 206.

The computing resource service provider 220 may provide various computing resource services to the entity. The services provided by the computing resource service provider 220, in this example, include a storage service 208. It is noted that not all embodiments described herein include all the services described with reference to FIG. 2 and additional services may be provided in addition to or as an alternative to services explicitly described. As described herein, each of the services may include one or more web service interfaces that enable the entity and/or other services to submit appropriately configured API calls to the various services through web service requests. In addition, in various embodiments, each of the services include one or more service interfaces that enable the services to access each other (e.g., to enable the ingestion service 206 to store data in or retrieve data from the storage service 208 and/or to access one or more databases provided by a database service).

In various embodiments, the storage service 208 comprises one or more computing resources that collectively operate to store data for the entity and/or other services using various storage devices (and/or virtualizations thereof). For example, the storage service 208 operates using computing resources (e.g., databases) that enable the storage service 208 to locate and retrieve data quickly and provided data in response to requests for the data. In an embodiment, the storage service 208 maintains stored data in a manner such that, when a request for a data object is retrieved, the data object can be provided (or streaming of the data object can be initiated) in response to the request. As noted, data stored in the storage service 208, in an example, is organized into data objects.

The data objects, in various embodiments, have arbitrary sizes except, perhaps, for certain constraints on size. Thus, the storage service 208 stores numerous data objects of varying sizes from the sources 202A and/or 202B in accordance with an embodiment. In various embodiments, the storage service 208 operates as a key value store that associates data objects with identifiers of the data objects which are used by the entity and/or other services to retrieve or perform other operations in connection with the data objects stored by the storage service 208. For example, the ingestion service 206 obtains a set of identifiers associated with data objects provided by the sources 202A and/or 202B and stored by the storage service 208. In such examples, the identifiers are placed in a queue and, when the ingestion service 206 ingests the data objects, the identifiers are retrieved from the queue and used to obtain the data objects (e.g., an API call to the storage service) from the storage service for ingestion.

In various embodiments, a notification service (not illustrated in FIG. 2 for simplicity) comprises a collection of computing resources collectively configured to provide notifications and/or topics to which entities and/or other services can subscribe to receive notification. For example, the ingestion service 206, via the notification service, receives a notification when the sources 202A and/or 202B provide data objects for ingestion (e.g., once the data objects have been received by the service computer systems 212 and/or stored by the storage service 208). In an embodiment, the notification service is used to generate topics for which entities and/or other services seek to receive notifications, execute applications, subscribe to topics, publish messages, or obtain delivery of the messages over a protocol of choice (e.g., hypertext transfer protocol (HTTP), e-mail, short message service (SMS), etc.). The notification service, for example, provides a "push" notification mechanism without the need to periodically or aperiodically check or "poll" for new information and updates. The notification service, in other embodiments, is used for monitoring applications by the ingestion service, workflow systems, time-sensitive information updates, mobile applications, and other services.

As described above, in various embodiments, the ingestion service 206 obtains a set of keys (not shown in FIG. 2 for simplicity) from the data objects in order to associate the data object with a single profile of the set of profiles 214A-214N. In addition, the set of keys are indexed and stored in a key repository 210. The key repository, in an embodiment is provided by a database service. The database service, in one example, is a collection of computing resources that collectively operate to run one or more databases. The ingestion service 206, in such examples, operates and manages a database (e.g., the key repository 210) from the database service by utilizing appropriately configured API calls. This, in turn, allows the ingestion service 206 to maintain and potentially scale the operations in the key repository 210 in accordance with an embodiment. Other services of the computing resource service provider 220, in various embodiments, include, but are not limited to, object-level archival data storage services, services that manage and/or monitor other services.

In various embodiments, unless otherwise stated or clear from context, the term "service" is understood to be a computer system program, process, client, server, service, application, module, operating system entity, controlling domain, communication node or collection of these and/or other such computer system entities. Furthermore, in an example, a "service" is a client and/or a server configured to send and/or receive communications, data, requests, and/or other such requests from other services within an environment.

Figure 3:
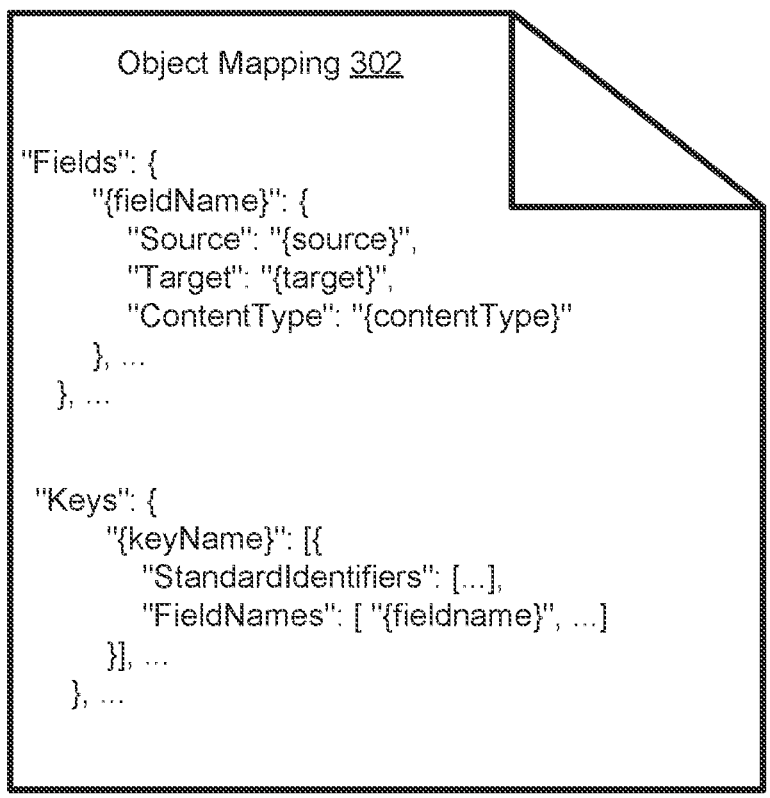
FIG. 3 illustrates an example of an object mapping that defines a conversion from data objects to profiles in accordance with an embodiment.
Figure 3:
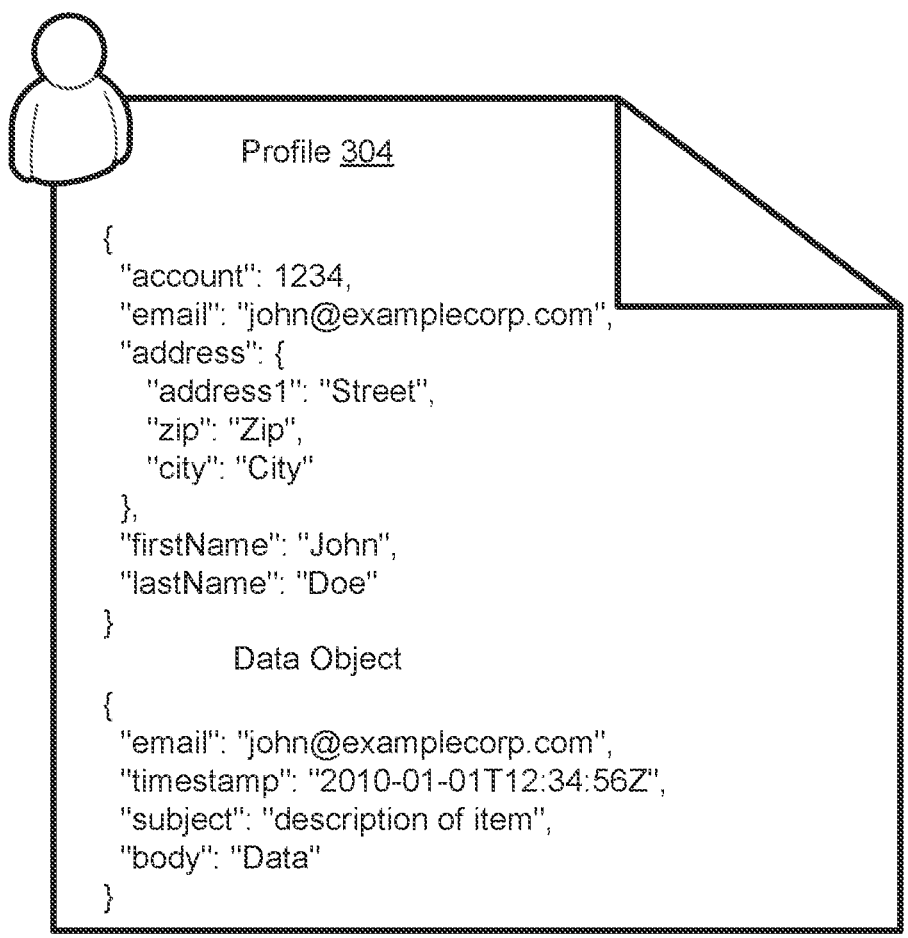

FIG. 3 is a diagram illustrating an object mapping 302 used to map data included in a data object to a data storage schema used to maintain data in a profile 304. In various embodiments, the profile 304 includes a data storage model that represents how data is stored within the profile 304. For example, as illustrated in FIG. 3, the profile 304 includes a set of fields (e.g., "account," "email," etc.) that indicate a structure and/or location of data stored within the profile 304. In addition, the object mapping 302 provides a mapping and/or translation for data included in a particular type of data object to fields within the profile 304 in accordance with an embodiment, In one example, the object mapping 302 is associated with a customer list data object and provides a mapping of data within the customer list data object (e.g., account number, name, address, order history, etc.) to corresponding fields in the profile 304.

In various embodiments, a profile parser or other source code executed by a computer system, converts data from an incoming data object (e.g., a data object being ingested by the ingestion service as described above) into the data storage model used by the profile 304. In addition, both the data object and any updates (if the data object includes data to update one or more fields in the profile 304) are persisted to the profile 304 in accordance with an embodiment. In one example, the data object is persisted within the profile along with any updates to one or more fields of the profile 304. In another example, an identifier or other data suitable for obtaining the data object (e.g., via an API call to a data storage service) is persisted in the profile 304 along with any updates to one or more fields of the profile 304. In addition, in various embodiments, the profile parser updates a set of indexes maintained in a key repository as described above, for the keys obtained from the data object and/or keys corresponding to fields that have been updated in the profile 304.

In an embodiment, the object mapping 302 defines or indicates where the keys are located within particular data objects and/or types of data objects. For example, the object mapping 302 provides a definition of one or more fields in an ingested data object that are to be mapped or otherwise assigned to a particular location and/or fields within the profile 304. In an embodiment, the object mapping 302 indicates to the ingestion service or other service fields in an ingested source data object to assign or otherwise store in corresponding fields in the profile 304. Various sources can define or otherwise provide the object mapping 302 including users, service providers, or other entities in accordance with an embodiment. For example, a cloud contact center can provide a mapping of contact records to profiles.

Furthermore, the object mapping 302, in an embodiment, includes information indicating fields in the data object that are to be indexed when ingested. For example, when data from a data object is ingested by the ingestion service, the indexed fields are determined based at least in part on information included in the object mapping 302. Indexing the keys, in various embodiments, allows the ingestion service to determine which profile a specific data object belongs to and/or is associated with (e.g., by searching the keys) and what values can be used to find the profile 304. For example, a user's name can be indexed, which allows agents (e.g., through the profile service or other service that can search the index) to find all profiles that belong to the user with that specific name.

As illustrated in FIG. 3, the key can be made up of one or more fields in accordance with an embodiment. The object mapping 302, in such embodiments, includes at least one key that uniquely identifies the profile 304 so that it can be updated by specifying the same value of this field (these requirements can be satisfied with a single key). For example, the profile 304 includes an "account" field for which each value is unique to a single profile. In various embodiments, a field definition specifies how to read a value for that field name from a data object (e.g., a data object of a particular type). In other embodiments, the field definition also specifies what kind of data is stored in the field. For example, as illustrated in FIG. 3 "Source:" specifies the data object (e.g., a JSON blob) being accessed; "Target:" specifies where in the profile 304 the data of this field should be mapped; "ContentType:" specifies the type of data being ingested.

In an embodiment, the following content types can be a specified string, number, phone number, email address, street address, name, and account number. In one example, if no "ContentType" is specified, a string value is used. Furthermore, "ContentType," in an embodiment, is used to determine how to index the value so it can be searched for. For example, if "ContentType" is set to phone number, a phone number is processed which it can search for in various formats (e.g., the string "+15551234567" matches "(555)-123-4567").

In various embodiments, the key contains one or more fields that together define the key that can be used to search for data, data objects, and/or the profiles associated with the key. In one example, the key repository is searched for using an API call and the key. As described above, the key can also be defined to uniquely identify the profile 304 or uniquely identify the data object itself in accordance with an embodiment. Furthermore, as described above, in at least one embodiment, key names are global to a domain and/or logical groupings of profiles. In other embodiments, if two keys share the same name in association with two different fields and/or data objects within the object mapping 302, the keys can be used to potentially link profiles together between different fields. For example, if the keys match between two distinct data objects, the ingestion service places the two data objects in the same profile (e.g., a phone number specified in one type of data object would be related to the same phone number specified in another type of data object).

In various embodiments, identifiers associated with keys allow the ingestion service or other service to set attributes on a particular key. For example, the identifier "profile" causes the key to be treated as a unique identifier for the profile (e.g., a search for a key marked a profile returns a single profile). Therefore, in such embodiments, if a key marked as "profile" is included in two or more profiles, the profiles will be merged. In yet other embodiments, keys can be indicated as "unique." In such embodiments, the "unique identifier" is specified by exactly one index for the field. This key is used to uniquely identify data of a particular field for either fetching profiles or updating a field based at least in part on a data object being ingested.

In yet other embodiments, the identifier "look up" indicates that the key is not stored after ingesting the data object. For example, the key is only to be used for determining the profile during ingestion and the key value is not associated with the profile during ingestion. In an embodiment, the identifier "new only" causes the ingestion service or other service to use the key to generate a new profile if a profile matching the key does not already exist before the data object is ingested, otherwise the key is only used for matching data objects to profiles. In another embodiment, the identifier "secondary" indicates that during the matching of a data object to a profile, the ingestion service first looks up all other keys prior to searching any keys marked "secondary." In addition, in various embodiments, an identifier can be assigned to a key that prevents the key from being used to generate new profiles.

Figure 4:
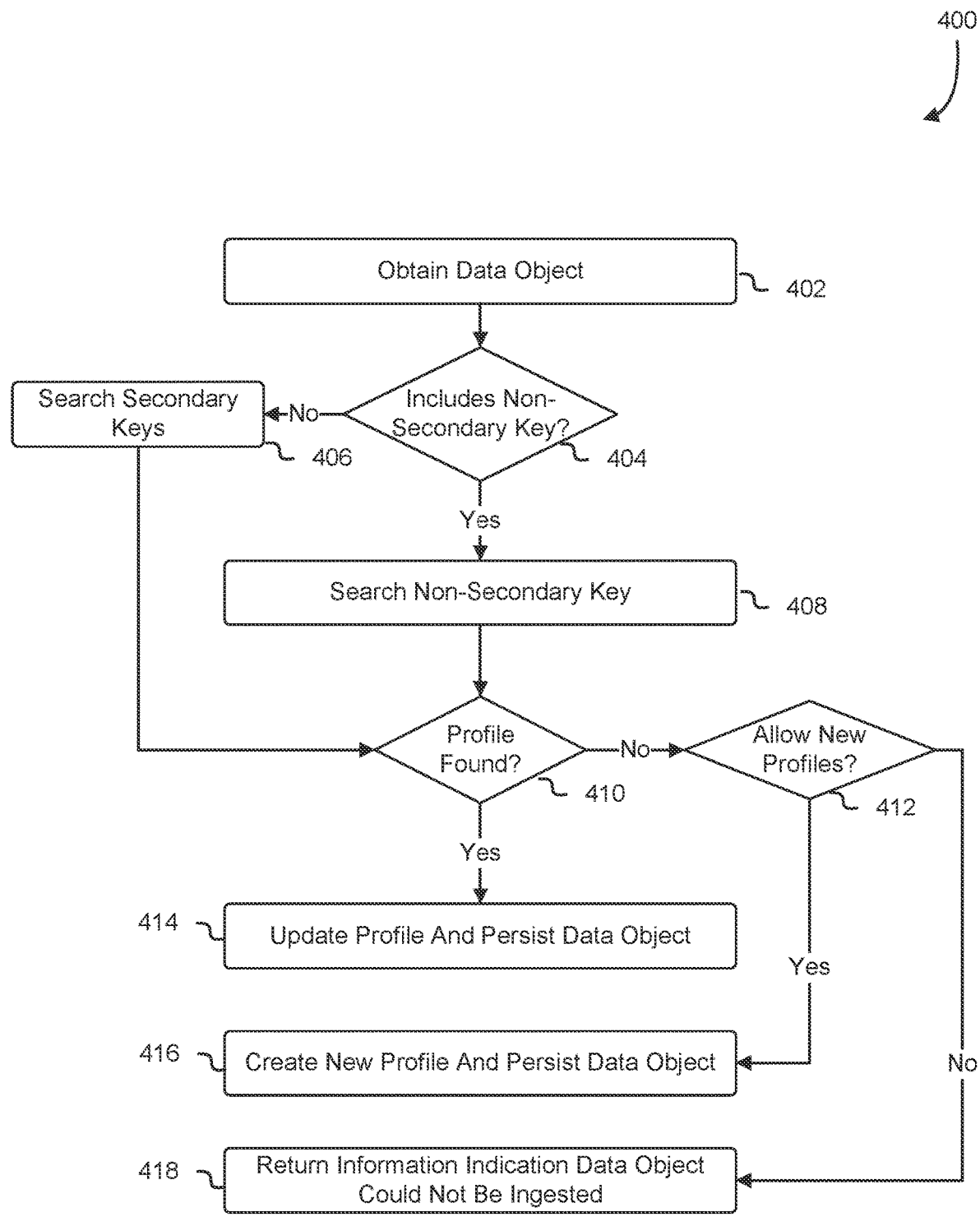
FIG. 4 illustrates a process of ingesting heterogeneous data objects in accordance with an embodiment.

FIG. 4 shows a process 400 for ingesting a data object in accordance with at least one embodiment. The process 400, in an embodiment, is performed by an ingestion service or other service as described above. Now referring to FIGS. 4 and 5, the blocks of processes 400 and 500, described in the present disclosure, in various embodiments, include a computing process that is performed using any combination of hardware, firmware, and/or software. The various functions, processes, and/or operations described in the present disclosure may be carried out by a processor executing instructions stored in memory. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 400 and 500 are described, by way of example, with respect to the computer system of FIG. 6. However, these processes may additionally or alternatively be executed by any one system, or any combination of systems, including, but not limited to, those described in the present disclosure. In addition, various blocks of the processes 400 and 500 may be performed in different and/or alternative orders, performed in serial or parallel, or omitted entirely.

Returning to FIG. 4, the system executing the process 400, at block 402 obtains a data object. In various embodiments, the data object is obtained from a source as described above. In addition, in various embodiments, the data object is maintained by a storage service that is accessible to the system executing the process 400. At block 404, the system executing the process 400 determines if the data object includes one or more non-secondary keys. As described above, keys indicated as secondary, in an embodiment, are used to search for a corresponding profile only if the data object does not contain any non-secondary keys. If the data object includes at least one non-secondary key, the system executing the process 400, in an embodiment, continues to block 408 and searches the non-secondary keys. However, if no non-secondary keys are included in the data object, the system executing the process 400, in an embodiment, proceeds to block 406 and searches the secondary keys.

Returning to block 408, the system executing the process 400, in an embodiment, searches a key repository for the non-secondary keys. As described above, an object mapping indicates the location of keys included in particular types of data objects. For example, the system executing the process 400 obtains the object mapping associated with the data objects and extracts the string values associated with the keys (e.g., name, phone number, account number etc.). In various embodiments, the system executing the process 400, then searches the key repository of profiles matching the keys extracted from the data object. Similarly, in block 406, the system executing the process 400, in an embodiment, searches the repository for profiles matching the secondary keys extracted from the data object if no non-secondary keys were extracted.

In block 410, the system executing the process 400, in various embodiments, determines if a profile is found matching at least one key. In various embodiments, the system executing the process 400 searches the keys in serial and terminates the search once a single profile is returned matching a particular key being searched. If a single profile is determined (e.g., returned in the search results associated with a particular key), the system executing the process 400, continues to block 414. In block 414, the system executing the process 400, in an embodiment, updates the profile with data extracted from the data object and the data object is persisted. In one example, a name and phone number string, values extracted from the data object, are used to update the profile and the data object is persisted within the profile.

If no profile is returned from the search results, the system executing the process 400, in an embodiment, determines if at least one key allows for a new profile to be created. At block 412, if the system executing the process 400, determines a key allows a new profile to be created, the process 400 continues to block 416. In block 416, the system executing the process 400, in an embodiment, creates a new profile including the data extracted from the data object and persists the data object. For example, a new profile is created and information extracted from the data object is associated with a user (e.g., name, phone number, account number etc.) and are persisted in the profile. Returning to block 412, if the system executing the process 400 determines that none of the keys allow for the creation of a new profile, in an embodiment, the process 400 continues to block 418. At block 418, the system executing the process 400, in an embodiment, returns information indicating that the data object could not be ingested. For example, a notification is transmitted to a user associated with an account of a profile service indicating the data object could not be ingested.

Figure 5:
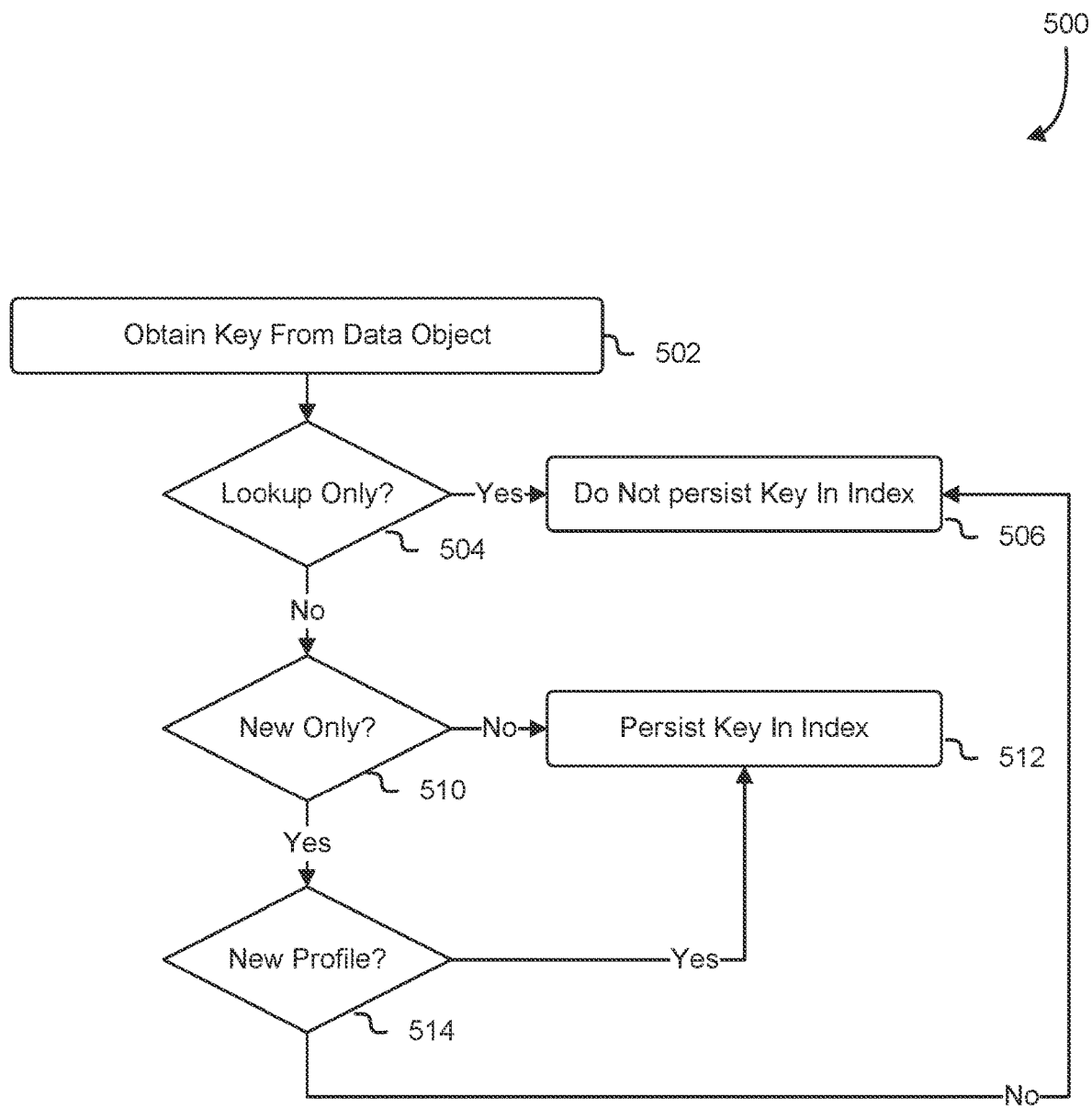
FIG. 5 illustrates a process of persisting keys in an index in accordance with an embodiment.

FIG. 5 shows a process 500 for updating a key repository in accordance with at least one embodiment. The process 500, in an embodiment, is performed by a profile service or other service as described above. At block 502, the system executing the process 500, in an embodiment, obtains a key from a data object. As described above, the key, in an example, includes a string value extracted from the data object that is used to search for a matching value stored in a profile. At block 504, the system executing the process 500, in an embodiment, determines if the key is assigned the identifier "lookup." As described above, identifiers can be assigned to a particular key to manage how the keys are ingested and indexed by the system executing the process 500. Returning to block 504, if the key is identified as lookup only, the system executing the process 500 continues to block 506. In block 506, the system executing the process 500, in an embodiment, does not persist the key in the index and the process 500 is terminated for that particular key (the process may be repeated for additional keys extracted from the data object).

However, if the key is not lookup only, the process continues to block 510, at block 510, the system executing the process 500, in an embodiment, determines if the key is indicated as "new." If the key is not indicated as new only, the process 500 continues to block 512. At block 512, the system executing the process 500, in an embodiment, persist the key in the index. For example, the system executing the process 500, updates the key repository with the key and information indicating a profile for which the key is associated with. However, at block 510, if the identifiers associated with the key indicates a new profile, the process 500 continues to block 514. At block 514, the system executing the process 500, in an embodiment, determines if the key has been associated with a new profile. For example, a search of the key did not return a matching profile and a new profile was created and associated with the key. At block 514, if a new profile was created, the system executing the process 500, continues to block 512 and the key is persisted in the index. However, at block 514, if the key is not associated with a new profile, the system executing the process 500, continues to block 506 and the key is not persisted in the index.

Figure 6:
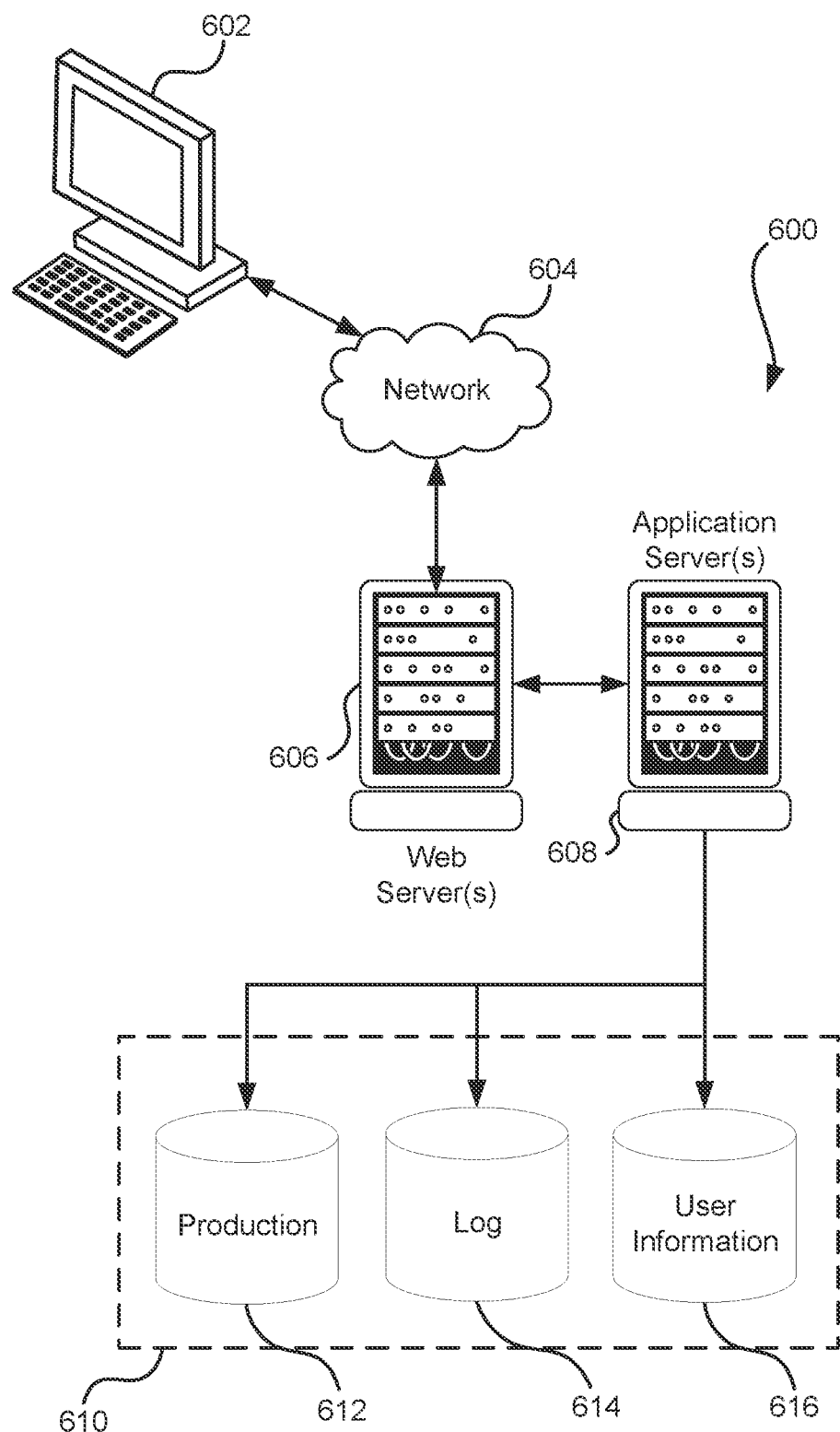
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining a data object comprising heterogeneous data and including a set of fields to be ingested to a profile of a set of profiles maintained by a computing resource service provider;
   performing an object mapping to map a first field of the set of fields to a corresponding field included in the profile and to convert a data format of the data object to a data format used by the profile;
   extracting, based at least in part on the object mapping, a set of keys included in the data object from the data object;
   querying an index, the querying including a first invalid result and a second valid result obtained in response to the first result being invalid;
   selecting the profile to update based at least in part on the first invalid result and the second valid result;
   updating the profile to include a subset of fields of the set of fields based at least in part on the object mapping to generate an updated profile;
   causing the data object and the updated profile to be stored, where the updated profile includes information indicating a storage location of the data object; and
   generating, for display, a profile view of the updated profile that provides, to a user, access to the data object through the profile view.

2. The computer-implemented method of claim 1, wherein the object mapping further comprises information indicating locations of keys of the set of keys within the data object.

3. The computer-implemented method of claim 1, wherein querying the index to determine that the first key of the set of keys is associated with the profile further comprises comparing a first value associated with the first key to a second value included in the profile, where the first key is associated with the profile based at least in part on the first value matching the second value.

4. The computer-implemented method of claim 3, wherein the first key is associated with a key name; and
   wherein querying the index to determine that the first key of the set of keys is associated with the profile further comprises determining that the first key value and the second key value are associated with a key name.

5. A system, comprising:
   one or more processors; and
   memory that stores computer-executable instructions that are executable by the one or more processors to cause the system to:
      obtain a data object comprising heterogeneous data and including a set of fields to be ingested to a profile; and
      update the profile by at least:
         performing a mapping to map a first field of the set of fields to a corresponding field included in the profile and to convert a data format of the data object to a data format used by the profile;
         extracting a first key of a set of keys from the data object based, at least in part, on the mapping comprising a relationship between the data object and the profile;
         obtaining a result of a search of the first key within an index based at least in part on a prior invalid result of a prior search of the index using a second key of the set of keys that is different from the first key;
         in response to the result indicating the profile includes the key, updating the profile to include data extracted from the data object and associated with the set of fields; and
         generating, for display, a profile view of the updated profile that provides, to a user, access to the data object through the profile view.

6. The system of claim 5, wherein the data extracted from the data object includes information associated with a user and is recorded in the set of fields.

7. The system of claim 5, wherein the profile is a member of a plurality of profiles that maintains information associated with users.

8. The system of claim 5, wherein the first key is indicated as a non-secondary key causing the system to search using the first key prior to at least one other key indicated as a secondary key.

9. The system of claim 5, wherein the set of fields includes at least one field corresponding to: name, address, email address, phone number, order number, account number, order history, street address, or support information.

10. The system of claim 5, wherein the relationship indicates a conversion from data included in the set of fields to store the data within the profile.

11. The system of claim 5, wherein the data object is a semi-structured data object and the set of fields is organized based at least in part on a format.

12. The system of claim 5, wherein the memory further includes computer-executable instructions that are executable by the one or more processors to cause the system to, prior to selecting the first key, obtain an invalid result of searching the index using at least one other key of the set of keys.

13. A non-transitory computer-readable storage medium storing thereon executable instructions that, as a result of being executed by one or more processors of a computer system, cause the computer system to:
   retrieve a data object to be ingested from a first storage device, the data object comprising heterogeneous data and including a set of fields;
   perform an object mapping to map a first field of the set of fields to a corresponding field included in a profile to update and to convert a data format of the data object to a data format used by the profile;
   extract a set of keys from the data object, the set of keys associated with a subset of fields of the set of fields based at least in part on the object mapping;
   search an index for a subset of keys of the set of keys;
   select the profile to update to include information indicated in at least one field of the set of fields based at least in part on:
      a first result of searching the index for the subset of keys of the set of keys, and a second search result obtained in response to the first result being invalid; and generate, for display, a profile view of the updated profile that provides, to a user, access to the data object through the profile view.

14. The non-transitory computer-readable storage medium of claim 13, wherein the instructions further comprise instructions that, as a result of being executed by the one or more processors, cause the computer system to create the profile in response to the search of the index for the subset of keys indicating that the subset of keys is not associated with one or more previously created profiles.

15. The non-transitory computer-readable storage medium of claim 13, wherein the instructions that cause the computer system to search the index for the subset of keys of the set of keys further include instructions that cause the computer system to:

obtain a first result of the search by at least querying the index using a first key of the subset of keys, where the first result is invalid; and in response to the first result being invalid, obtain a second result of the search by at least querying the index using a second key of the subset of keys.

16. The non-transitory computer-readable storage medium of claim 15, wherein the first result is invalid as a result of the first result indicating that the first key is associated with a plurality of profiles.

17. The non-transitory computer-readable storage medium of claim 13, wherein the object mapping indicates a first location of a value within the data object is associated with a first key of the set of keys and a field included in the profile corresponding to the first key.

18. The non-transitory computer-readable storage medium of claim 17, wherein the instructions that cause the computer system to search the index for the subset of keys of the set of keys further include instructions that cause the computer system to search the index for the profile associated with the value.

19. The non-transitory computer-readable storage medium of claim 13, wherein a first key of the set of keys is associated with an identifier that indicates to the computer system an attribute of the first key.

20. The non-transitory computer-readable storage medium of claim 13, wherein a first key of the set of keys includes a string value extracted from the data object.

* * * * *